United States Patent [19]

McCullough et al.

[11] Patent Number: 5,403,395
[45] Date of Patent: Apr. 4, 1995

[54] REEL FOR APPLYING TOPICAL SUBSTANCES TO BASE PRODUCTS

[75] Inventors: Nancy J. McCullough, Battle Creek; Kenneth A. Seymour, East Leroy; Harold F. Yother, Battle Creek, all of Mich.

[73] Assignee: Kraft General Foods, Inc., Northfield, Ill.

[21] Appl. No.: 60,471

[22] Filed: May 11, 1993

Related U.S. Application Data

[63] Continuation of Ser. No. 802,114, Dec. 4, 1991, abandoned.

[51] Int. Cl.$^6$ ............................................. A23G 3/26
[52] U.S. Cl. ................................... 118/19; 118/24; 118/70; 118/303; 118/418; 366/234; 366/220; 366/120; 134/120; 427/242; 34/135; 34/136; 34/137
[58] Field of Search ................ 118/19, 24, 70, 303, 118/418; 366/234, 220; 134/120; 427/242; 34/135, 136, 137, 133 G

[56] References Cited

U.S. PATENT DOCUMENTS

| | | | |
|---|---|---|---|
| 1,284,511 | 11/1918 | Wenzel | 366/220 |
| 1,375,107 | 4/1921 | Rayburn | 366/220 |
| 3,337,442 | 8/1967 | Kiefer et al. | 366/234 |
| 3,739,743 | 6/1973 | McKee, Jr. | 118/418 |
| 3,905,122 | 9/1975 | Ohshima et al. | 34/135 |
| 4,287,672 | 9/1981 | Henig | 118/418 |
| 4,430,003 | 2/1984 | Beattie et al. | 118/303 |
| 4,530,305 | 7/1985 | Gunnell | 118/418 |
| 5,022,773 | 6/1991 | Waldinger et al. | 401/107 |

Primary Examiner—W. Gary Jones
Assistant Examiner—Mark De Simone
Attorney, Agent, or Firm—Thomas R. Savoie; Thomas A. Marcoux

[57] ABSTRACT

An arrangement for the application of topical substances to base products. A rotatable star-shaped reel structure is rotated, in which a flowable base product is tumbled while being coated with the topical substance so as to ensure an appropriate uniform distribution of the topical substance on the surfaces of the base product while inhibiting the formation of clump-like agglomerates of coated base product on the internal surfaces of the reel.

12 Claims, 3 Drawing Sheets

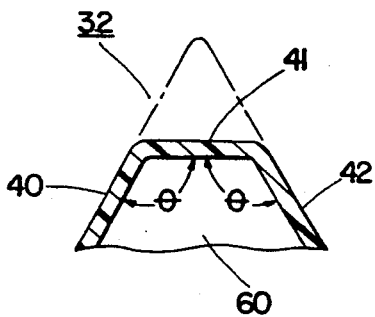
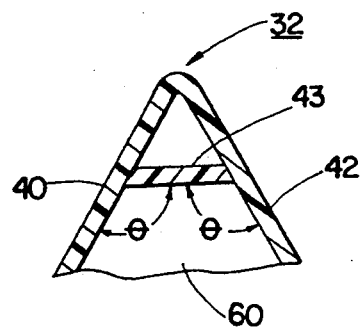
Fig. 4a    Fig. 4b
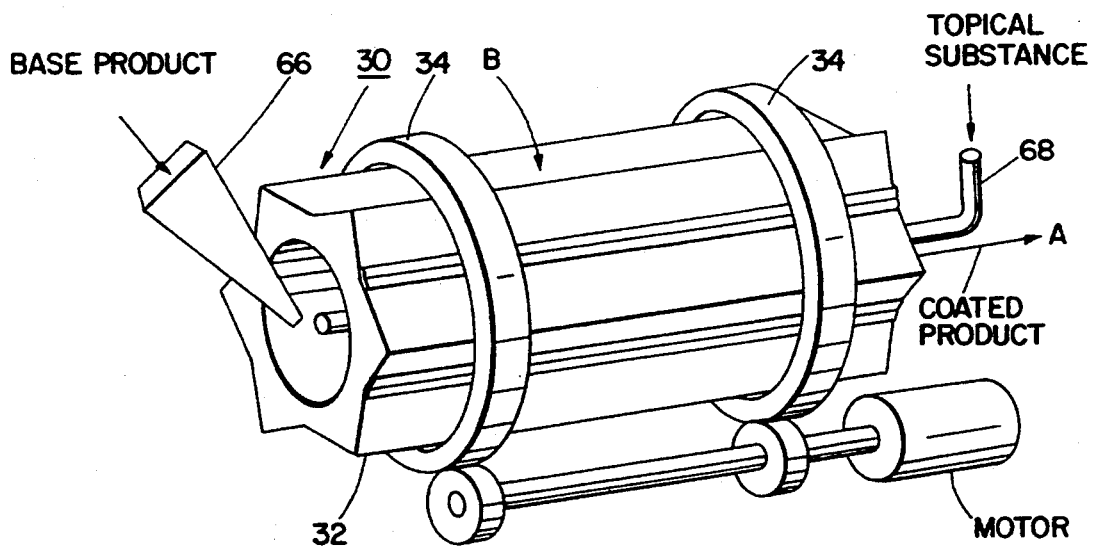
Fig. 6
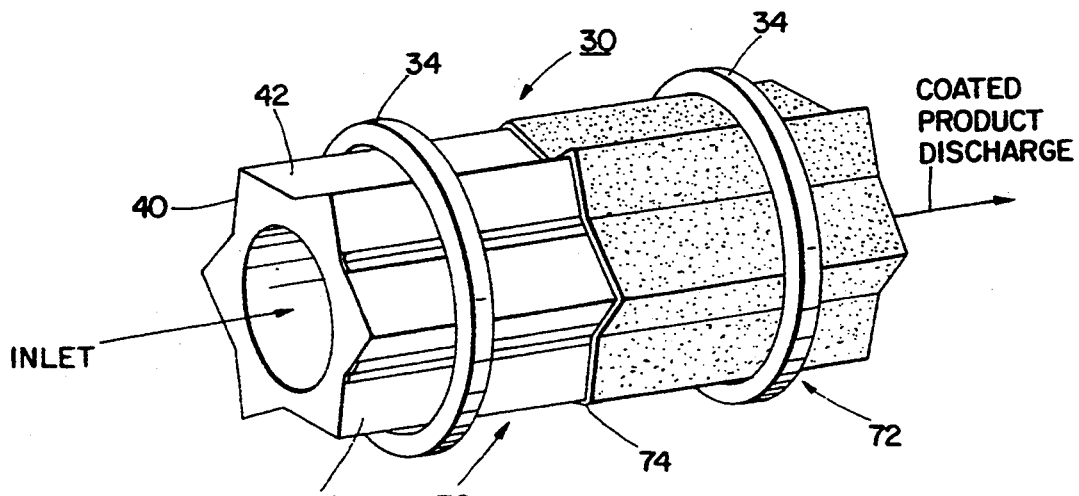
Fig. 7

REEL FOR APPLYING TOPICAL SUBSTANCES TO BASE PRODUCTS

This application is a continuation of application Ser. No. 07/802,114, filed Dec. 4, 1991, now abandoned.

BACKGROUND OF THE INVENTION

1. Field of the Invention

The present invention relates to an arrangement for the application of topical substances to base products, and more particularly, relates to a rotatable star-shaped reel structure in which a flowable base product is tumbled while being coated with the topical substance so as to ensure an appropriate uniform distribution of the topical substance on the surfaces of the base product while inhibiting the formation of clump-like agglomerates of coated base product on the internal surfaces of the reel.

In the food technology, for example, such as in the production of so-called ready-to-eat dry cereals normally served with milk and sugar and/or fruit, in which the cereal is identified as the base product, it has become a widespread practice to coat such basic cereals with topical substances which may be solutions containing sugar, or mixtures of sucrose, dextrose, levulose, dextrins and the like nonsucrose sugars, referred to as invert sugars, or possibly vitamins in fat, in order to impart to the cereal various flavorings, organoleptic properties and vitamin supplements which are desirable to potential consumers as inducements for the purchase of the particular product.

Among such base products may be cereal bodies which are essentially non-porous, non-spherical or more or less flat in configuration, for example, corn flakes or similar flake-shaped products; or smoothly rounded or spheroidal bodies; for instance, such as puffed rice, wheat or the like, all of which present difficulties in implementing applications of relatively uniform coatings of the topical substances onto the surfaces of the base product; in effect, the cereal, which will not only impart the desired flavors thereto but also a texture rendering the product attractive and organoleptically palatable to potential and discriminating consumers.

2. Discussion of the Prior Art

Heretofore, and up to the present time, such topical substances have normally been applied to base products; referring in particular to the coating of dry cereals with solutions containing sugar or candy constituents of the type referred to hereinabove, while being introduced into a rotatable reel or drum possessing an essentially cylindrical interior which has its longitudinal central axis angled downwardly from an infeed end for the base product or cereal towards a discharge end and which includes a stationary conduit extending longitudinally and coaxially through the drum including spray nozzles for spraying and coating the base product with a liquefied topical substance, such as a sugar solution, dextrins, fructose, invert sugars, vitamins in fat and the like, as is desired for the particular coated cereal product. The drum has mounted, on the internal annular surface thereof, a plurality of circumferentially spaced and radially inwardly projecting axially extending ribs or fins which divide the drum periphery into a plurality of longitudinal compartments substantially extending the length of the drum, and which cause tumbling of the base product to enable the sprayed topical substance to be coated on the surfaces thereof during the rotation of the drum while being conveyed towards the discharge end of the latter. Hereby, the drum is maintained at a predetermined speed of rotation about its central longitudinal axis commensurate with the type of product being coated, and with the rotation being imparted to the drum through the intermediary of a suitable belt drive or motor-driven gear system, as is generally known in this technology. Concurrently, the drum which is ordinarily constituted from stainless steel, may have the interior thereof heated by an external heat source, such as a gas burner or the like, in order to maintain a predetermined heated atmosphere within the drum to prevent the buildup of lumps from fines and/or sugar in the topical substance on the surfaces of the cereal product, which may be considered objectionable by consumers. Although widely employed in the food industry relative to the coating of cereals with topical substances, steel drums or reels of cylindrical configurations having internal radially inward extending ribs or fins of the type mentioned hereinabove are subject to various drawbacks, and frequently fail to provide uniformly coated base products or cereals meeting consumer requirements. In essence, quite frequently, during the coating procedure, the syrupy topical substances produce lumps of fines and/or sugar within the drum which may produce unsightly clumps of product resulting in consumer complaints relative to the consistency and quality and of the product, and possibly adversely affect sales and product representation. Moreover, the lumps also tend to collect on the surfaces of the fins during rotation of the reel, and as a result adversely affect and retard the desired tumbling action of the product. Additionally, such steel drums or reels require frequent scraping and/or washing of the internal drum surfaces to remove agglomerated and sticky material adhering thereto, resulting in loss of product yield, downtime of the equipment and potential spud metal contamination of sugar-coated cereals produced in this manner.

Moreover, the requirement for heating the atmosphere within the drum by means of external heaters; for example, such as gas burners, which are employed to prevent build-up of lumps and agglomerations of fines or sugar, necessitates the expenditure of considerable amounts of energy, and often leads to burnt and charred particle contamination of the product being coated, again reducing the consistency and quality of the coated cereals.

SUMMARY OF THE INVENTION

In order to overcome the disadvantages and to ameliorate or eliminate the shortcomings encountered with respect to the foregoing cylindrical drum-shaped reel configuration of the current technology employed in the coating of base products; for instance, such as dry cereals, with various kinds of topical substances of the type mentioned hereinabove, the invention contemplates the provision of an essentially star-shaped reel in lieu of the cylindrical drum structure possessing the internal fins, thereby considerably enhancing the tumbling action of the contents to more uniformly coat topical substances on a base product in a highly efficient and economical manner.

Pursuant to a preferred embodiment, the inventive rotatable reel is formed of an elongated structure having a star-shape, six points in transverse cross-section and is constituted of a non-stick polymer; for instance, such as an ultra high molecular weight polyethylene, supported in trunnions facilitating rotation of the reel about the longitudinal central axis thereof. The utilization of a non-stick polymer material for the reel eliminates the need to heat the atmosphere of the reel with the aid of external heating devices, such as gas burners, in view of the enhanced tumbling action produced by the star-shape forming pockets, and the virtually self-cleaning characteristics of the reel structure, inasmuch as fines and sugar syrup constituted from the topical solutions are essentially unable to stick to and form lumps or aggregations on the slick, high-density polymer surface. The pockets which are formed by the star-shaped configuration and which replace the internal fins of the cylindrical steel reel, promote and enhance the desired tumbling action, and in essence, also assist in maintaining the surfaces of the reel in a clean condition by avoiding the formation of lumps of fines and/or sugar agglomerations which tend to form in the metal reel having the internal fins; while concurrently propagating a more uniform coating action.

Moreover, the elimination or reduction in the need for reel scraping and/or washing due to the absence of sticking of the materials to the surfaces within the reel structure in response to the utilization of the star-shaped reel of polymer material also reduces maintenance costs inasmuch as the substantially lighter-weight polymer in comparison with steel does not impart a degree of wear to rotating and load-bearing components of the arrangement as readily as would the relatively heavier, conventional internally-finned steel reel or drum. Furthermore, the consequential elimination of the need for heating the reel to provide a heated atmosphere to prevent clumping of fines or sugars within the reel also saves energy thereby reducing processing costs while removing a potential source of product contamination caused by the possible presence of burned and charred particles on the reel wall surfaces.

Pursuant to another aspect of the invention, rather than employing a non-stick high density or ultra high molecular weight polymer reel construction as mentioned hereinbefore, it is also possible to contemplate the utilization of a stainless steel reel of star-shaped transverse cross-section which, although heavier in construction than a polymer reel and possibly necessitating the application of external heat to inhibit fines and/or sugar sticking to the internal surfaces of the metal reel tending to form lumps, will still provide an enhanced tumbling action to the contents of the reel due to the star-shaped pocket-forming configuration thereof, which in essence, will reduce the potential for clumping and agglomeration of materials in the drum in contrast with currently employed cylindrically-shaped reels incorporating internal fins.

Another alternative reel arrangement for the coating of base products with topical substances, particularly cereals and various coating solutions of the type described herein, consists of constructing the star-shaped reel from a screen material, preferably from a non-stick plastic material or other fibrous constituent which, in addition to its lightweight structure eliminating the necessity for external heating while saving operating energy and reducing maintenance costs, permits fines and small particles normally tending to collect and agglomerate within the reel to pass out through the mesh of the peripheral wall surfaces of the reel so as to obviate or at least significantly reduce the tendency of lumping of materials being coated with the topical substance. It is also possible to contemplate that the material for the star-shaped reel constituting the fine-meshed screen be produced from fiberglass or nylon rather than the polymer material as described hereinabove, and if desired the interior surfaces thereof coated with teflon to impart a non-stick low-friction property to the surfaces of the screen. It is also possible that the mesh be constituted from a metallic material, such as stainless steel.

Pursuant to a further alternative embodiment, the star-shaped reel may be constituted of two contiguous sections, in which the infeed section for the flowable product, such as cereal or the like, may be of a solid wall structure constituted from the ultra high molecular weight polyethylene, and the second or downstream section extending towards the discharge end of the reel is constituted from the mesh material, constituting the screen enabling the passage thereto of the fines or minute particles as mentioned hereinabove. The screen material may be fastened to the solid-walled leading end portion of the star-shaped reel by suitable plastic materials, as is described in the copending application entitled "METHOD FOR JOINING ULTRA HIGH MOLECULAR WEIGHT POLYETHYLENE". The interior surface of the star-shaped reel portion which is constituted of the screen material, when constructed from steel may be ceramic-coated. Hereby, the provision of the second section of the reel from the mesh or screen material provides an interior essentially rough surface which, particularly when the topical substance is a cocoa syrup containing chocolate, and which normally has difficulties in solidifying onto the material being coated, causes the rough surface of the mesh to crystallize the particles as a result of shock effects being imparted thereto during the tumbling action.

Accordingly, it is an object of the present invention to provide an arrangement for the improved and more uniform application or coating of a base product which is preferably of a flowable nature, with topical substances.

A more specific object of the present invention resides in the provision of a rotatable star-shaped reel construction of novel configuration enabling the coating of base products conducted therethrough with topical substances while being tumbled so as to provide a more uniformly-coated final product.

Yet another object of the present invention is to provide a rotatable star-shaped reel structure of the type described herein which is essentially constituted from a non-stick, lightweight polymer material in which the tumbling action is enhanced due to the formation of pockets while and the formation of lumps and agglomerates by fines and particles in the reel is inhibited due to the non-sticking properties of the reel material.

Yet another object of the present invention is to provide a star-shaped reel, preferably of a fiberglass material, steel or lightweight ultra high molecular weight polymer, in which the peripheral wall structure of the reel is constituted from fine-meshed material enabling the passage therethrough of fines and small particulate materials normally tending to stick to and agglomerate within the reel and produce undesirable clumps thereof adversely affecting the quality of the product being coated.

Yet another object of the present invention is to provide a star-shaped reel the type described herein having a first infeed portion containing solid-surfaced walls which extend into a second portion constituted of a fine-meshed screen material enabling the imparting of shock to topical substances being coated on the basic material so as to crystallize the topical substances and to aid in the coating of the base substances.

BRIEF DESCRIPTION OF THE DRAWINGS

The foregoing and other objects of the present invention may now be more readily ascertained from the following detailed description of exemplary embodiments of the rotatable reel structure, taken in conjunction with the accompanying drawings; in which:

FIG. 4a and 4b illustrate, respectively, different embodiments for the apex portion of the star points as shown in the encircled portion "A" in FIG. 3;

FIG. 6 illustrates a generally diagrammatic perspective view of the star-shaped reel of FIG. 2 with the motive device for imparting rotation thereto;

FIG. 7 illustrates a perspective view of a further embodiment of the star-shaped reel pursuant to the invention.

DETAILED DESCRIPTION

Figure 1:
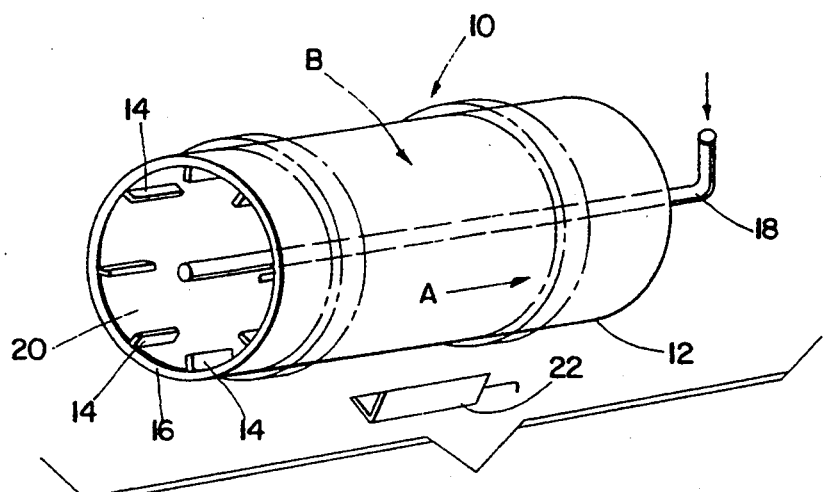
FIG. 1 illustrates a generally perspective view of a prior art type of reel or drum for the coating of a base product with a topical substance.

Referring in particular to FIG. 1 of the drawings illustrating a currently utilized reel or cylindrical drum 10 for the coating of base products with topical substances; for instance, wherein the base product may be flowable such as a dry cereal either in a flake-like or puffed (spheroidal) configuration; and in which the topical substance which is sprayed into the reel in a syrupy solution or liquefied form may consist of sugar and/or a mixture of sucrose, dextrose, levulose, dextrins and the like or invert sugars possessing a specified moisture content. Moreover, the topical substances may include or consist of vitamins soluble in fat and which will set on the surfaces of the base products or cereal within the drum or reel during rotation of the latter while being conducted towards a discharge end of the drum.

Pursuant to the prior art reel construction, the reel 10 essentially consisted of a cylindrical stainless steel body 12 having a plurality of axially extending radially inwardly protruding fins 14 circumferentially distributed about the periphery of the internal cylindrical wall structure 16. A conduit 18 extends generally coaxially within the rotatable reel 10, and introduced therein from the discharge end of the reel and extends forwardly towards an infeed end so for a flowable base product, such as dry cereal being conveyed into the reel from a suitable inlet chute (not shown). The conduit 18 incorporates nozzles adapted to spray along the length thereof, the topical substance as mentioned hereinbefore onto the surfaces of the base product contained in the reel 10. During rotation of the reel 10, while the base product is being conveyed towards the discharge end of the reel along the direction of arrow A, the rotation of the reel about its central longitudinal axis, as shown by arrow B, causes the base product or, in essence the cereal, to be continually tumbled so as to facilitate the coating of the surfaces thereof with the sprayed in topical substance. Ordinarily, inasmuch as the cylindrically-shaped reel 10 is normally constructed from stainless steel or similar metal and in order to maintain a temperature in the interior thereof at a sufficient height to prevent the fines from the topical solution from sticking to the steel surfaces of the reel and form clumps, a suitable external heater 22, such as a gas burner, is located beneath the rotating reel 10.

The utilization of stainless steel cylindrical drums or reels 10 with radially inwardly protruding steel fins 14 frequently causes the formation of lumps or agglomerations of fines or particles from the topical substance-coated base product in the regions between each of the fins, which also tend to cling to the surfaces of the fins 14 during rotation of the reel 10 due to the radially inwardly directed reduced space between the fins, thereby producing clumps or charred product and crystallization of the topical substance, which may cause the coated product or cereal to be of a quality which becomes potentially unattractive or distasteful to a consumer. Moreover, the requirement for heating of the stainless steel cylinder 12 of the reel by means of the external burner 22, at times causes charring of the product contained therein so as to render the latter unusable, while necessitating the expenditure of considerable energy and wear on mechanical drive components employed for rotating the relatively heavy steel reel. Moreover, the potentially encountered scorching or charring of the contents of the reel 20 in view of the heat being imparted to the reel surface 12 necessitates the frequent scraping and/or cleaning of the reel, resulting in considerable non-productive downtime for the equipment, and consequently increasing the manufacturing costs for the product to possibly uneconomical levels.

Figure 2:
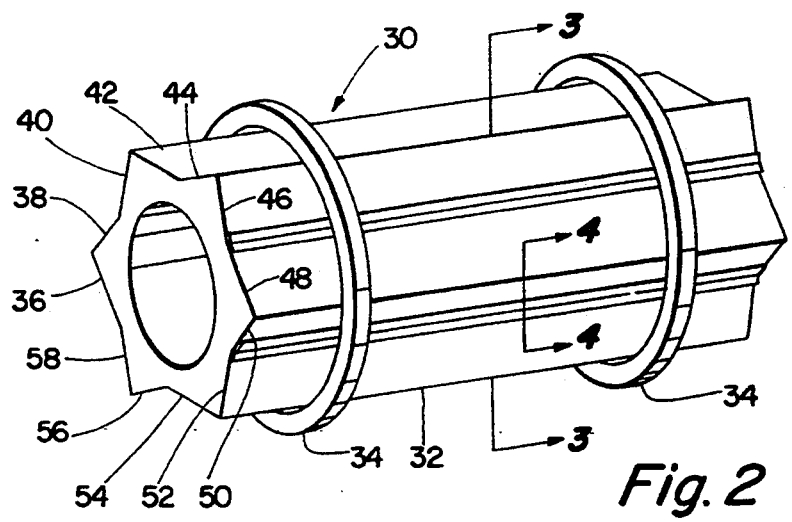
FIG. 2 illustrates the star-shaped reel for coating a base product with a topical substance pursuant to the present invention.
Figure 3:
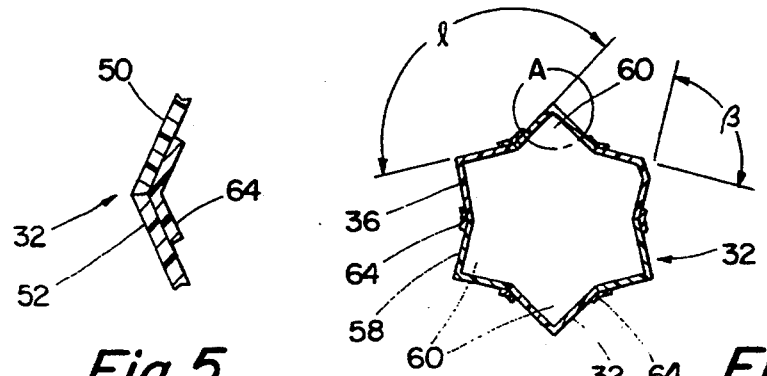
FIG. 3 illustrates, generally diagrammatically, a transverse cross-sectional view of the reel taken along line 3—3 in FIG. 2.

Pursuant to one embodiment of the invention, instead of utilizing an essentially cylindrical or drum-shaped reel 10 as disclosed in FIG. 1 of the drawings, as shown in FIGS. 2 and 3, there is employed a reel 30 of generally star-shaped configuration in transverse cross-section, consisting of an elongate body member 32, preferably of but not limited to a six-pointed star shape in transverse cross-section. The outer circumference or perimeter of the star-shaped reel 30 is encompassed by trunnions 34 enabling the imparting of rotation about its longitudinal axis to the reel 30 by means of suitable driving components; for example, such as a belt or gear drive motor, as is well known in the technology.

Hereby, pursuant to a preferred construction, the material for the sidewalls 36 to 58 of the reel 30 may be of a suitable non-stick high density or ultra high molecular weight (UHMW) polyethylene or similar polymer which will provide for high mechanical strength and rigidity and resistance to heat during operation, with the non-stick surface of the polymer facing the interior of the reel 30, if desired, being coated with polytetrafluoroethylene (Teflon) to further inhibit the sprayed topical substance or the topical substance-coated base product from sticking to the interior surfaces of the sidewalls 36–58 of the reel 30.

Moreover, as shown in FIG. 3 of the drawings, by selecting a six-pointed star for the transverse cross-sectional configuration of the reel 30, the outwardly converging walls of each star point portion form a basically trough-shaped or triangular pocket 60 which has the radially outer point or apex thereof either flattened or rounded off to preclude the presence of sharp corners tending to enable fines or particles to lump or agglomerate therein. As shown in the details relative to the apex portion of each star point which forms the pocket 60, in the embodiment of FIG. 4a of the drawings, the apex is actually bent so as to form a flattened surface 41 between the sidewalls 40 and 42 so that the angle interiorly of the pocket 60, as represented by angle Θ provides an obtuse angle which will inhibit the formation of sharp corners providing a tendency for the fines or particles to agglomerate or lump therein.

In the alternative structure shown in FIG. 4b, the sharp apex point of each star point has an internal plate 43 welded to the insides of the sidewalls 40 and 42, to again form an obtuse angle Θ between each sidewall and the plate 43, thereby eliminating the sharp or acute angles tending to collect and agglomerate material therein. The foregoing, although described with regard to pocket 60 between sidewalls 40 and 42, naturally also applies to each of the other pockets of the star-shaped reel 30.

Hereby, the angle α between each of the star points of the reel may also be formed to be relatively wide so as to subtend an obtuse angle of about 150°, while each pocket subtends an angle β of about 90°. Naturally, star-shaped cross-sectional configurations for the reel 30 may be suitably selected, as necessary, having either more or less star points than a six-pointed star-configuration as that shown, and with differing angles α and β, depending upon the type of base product adapted to be coated with topical substances.

The utilization of a reel 30 of star-shaped cross-sectional configuration and consisting of a relatively lightweight polymer, considerably lowers the overall weight of the rotating reel equipment, thereby reducing wear on any drive components required to rotate the reel, and the elimination of an external heater as employed in the prior art also reduces the expenditure of electrical and/or heating energy, inasmuch as the nonstick properties of the internal wall surfaces of the polymer reel obviate the need for heating of the material being processed in the reel. The enhanced tumbling action obtained due to the pockets 60 with widely diverging walls and obtuse angles also causes a cleaning action to be constantly exerted against the inner wall surfaces by the tumbling product, thereby again producing a tendency of lumping of fines and particulate materials.

This cleaning result is obtained by some of the base product sliding down the diverging walls having obtuse angles rather than simply being held in a pocket and dropped as the base product is elevated on turning the reel. The base product sliding down the wall produces a cleaning or wiping action which removes any solids tending to adhere to the walls thereby reducing product contamination caused by such adhering solids. In addition, this sliding causes less impact of base product in free all and reduces breakages.

Figure 5:
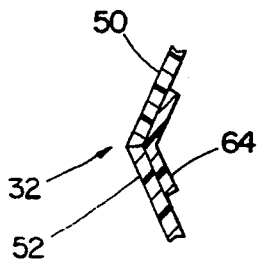
FIG. 5 illustrates, on an enlarged scale, a fragmentary sectional view of a longitudinal connecting seam structure for the sidewall surface sections of the reel, taken along line 5—5 in FIG. 2.

In order to impart the necessary mechanical rigidity and strength to the reel 30, the sidewalls 36–58 which are constituted from angled sections contacting along their edges at the bases of each star point system, may be welded together by suitable angled support ribs 64, as shown in FIG. 5, extending the length of the sidewalls of the reel so as to form a juncture of the bases of the star point pockets. The method of welding the ribs 64, which may be of a rigid polymer material, to the sidewalls 36–58 is described in U.S. patent application Ser. No. 803,272, filed on Dec. 4, 1991, entitled "METHOD FOR JOINING ULTRA HIGH MOLECULAR WEIGHT POLYETHYLENE". Each rib is contoured and angled in conformance with the angle α; i.e. about 150°, subtended between adjacent star points. These angled support ribs 64, in conjunction with the spaced trunnions circumferentially encompassing the sidewalls of the star-shaped reel 30 produce an extremely rigid and mechanically high-strength structure which, nevertheless, is relatively low in weight in comparison with the stainless steel cylindrical reel 10 of the prior art, while imparting an enhanced tumbling action to the product in each of the pockets 60 represented by the respective points of the star shape.

As illustrated in FIG. 6 of the drawings, in a diagrammatic representation, the star-shaped reel 30 may have its longitudinal axis of rotation sloping downwardly from the infeed end for the base product, whereby the product may be fed into the confines of the reel through a suitable inlet chute 66, while a stationary conduit 68 for the supplying of topical substances through spray nozzles 70, not shown, extends through the reel from the opposite or discharge end of the latter as mentioned hereinabove. The reel 30 constructed pursuant to FIG. 2 may be driven by means of a suitable belt drive (not shown) or supported for rotation on the trunnions or, alternatively, driven by a suitable gear drive arrangement, as is known in the technology.

Instead of the polymer material of the reel 30 shown in FIG. 2 being of an impermeable nature, particularly the body member 32, it may also be constituted from an essentially fine-meshed scanning material which will permit the outward passage therethrough of fines and/or small granulate material normally collecting in the pockets 60 formed by the star points which it is desired to eliminate from the interior of the reel during the coating process. This continual removal of the fines during the rotation of the reel will enable the apparatus to operate for lengthier periods of time without having to be scraped and cleaned at frequent intervals. When the material of the reel is of the fine-meshed screen, it may be constituted of a suitable temperature-resistant woven fiberglass sheeting material which, if desired, may be imparted a Teflon (registered TM) fluorocarbon resin coating to render it non-sticking in nature so as to inhibit adherence of fines from the topical substance-coated base product to the interior surfaces of the real during operation thereof and to allow encountered fines to pass out from the reel through the meshes of the reel wall material. In lieu of the fiberglass screening material being employed for the sidewalls of the star-shaped reel 30, other suitable materials may also be utilized; for example, such as perforate ultra high density plastics, or nylon, or possibly even steel mesh which has the internal surfaces of the steel covered with a ceramic coating. A further advantage of using a fine mesh screen is its ability to deflect when subjected to the force of base product dropping from an elevated position to the floor or lower section of the revolving reel. This deflection or resiliency of the screen material absorbs some of the energy of the falling base product thereby reducing the force of the collision of base product with the reel, and thereby reducing breakage and generation of unwanted fines.

Alternatively, pursuant to a modified embodiment of the invention, the star-shaped reel. 30 rather then being formed from a polymer or fiberglass material, may be constructed from steel, particularly stainless steel, and may also be equipped with an external heater, such as a gas burner, to maintain the internal atmosphere of the reel heated to a desired temperature level. Although this apparatus employing a steel reel is more cost-intensive in the use of operating energy than a reel which is constituted from a polymer, and also requires heavier driving equipment for rotating the steel reel, it provides the advantage over the cylindrical and internally-finned prior art structure shown in FIG. 1, in that the star-shaped cross-section forms the pockets 60 which enhance the tumbling action of the base product during coating with the topical substance and concurrently eliminate regions of possible collections of fines and/or sugars, thereby decreasing the potential for lumping and agglomeration of such substance within the reel as is frequently encountered in the prior art, thereby reducing potential charring and scorching effects adversely affecting the quality of the final product.

Referring to the modified embodiment of the star-shaped reel pursuant to the invention as shown in FIG. 7 of the drawings, in this instance, the reel 30 is essentially of a composite structure having a first or inlet portion which may be similar or identical to that described in connection with FIG. 2 of the drawings, in that this first portion 70 has essentially impervious or solid sidewalls 36–58 as shown in the embodiment of FIG. 2 and 3 of the drawings; and the outlet end thereof is connected to a similarly star-shaped reel portion 72 which is constituted from the fine-meshed screen material of the type as described hereinbefore. Thus, particularly when the topical substance is a cocoa syrup possessing chocolate, which creates difficulties in crystallizing during the coating process onto the basic product, such as dry cereals or the like, the tumbling within the second portion 72 of the star-shaped reel whereby the material being tumbled contacts the rough internal surface of the mesh produces a shock effect tending to crystallize the particles of the topical substance, thereby enhancing the complete and uniform coating of the base product. In addition, the resiliency of the mesh screen reduces breakage and the development of fines as noted previously. The second or downstream section 72 of the star-shaped reel is connected to the polymer of the first section 70 by means of high density or high molecular weight polyethylene strips 74 encompassing the periphery between the sections 70, 72, and which may be welded to the first portion 70 of the reel as described in the copending application. The reel portion which is constituted from the mesh or screen material, may have rounded apex points for each of the stop points so as to be insertable into the discharge end of the first reel portion 70 and possibly encompassed by a cylindrical housing (not shown).

Figure 8:
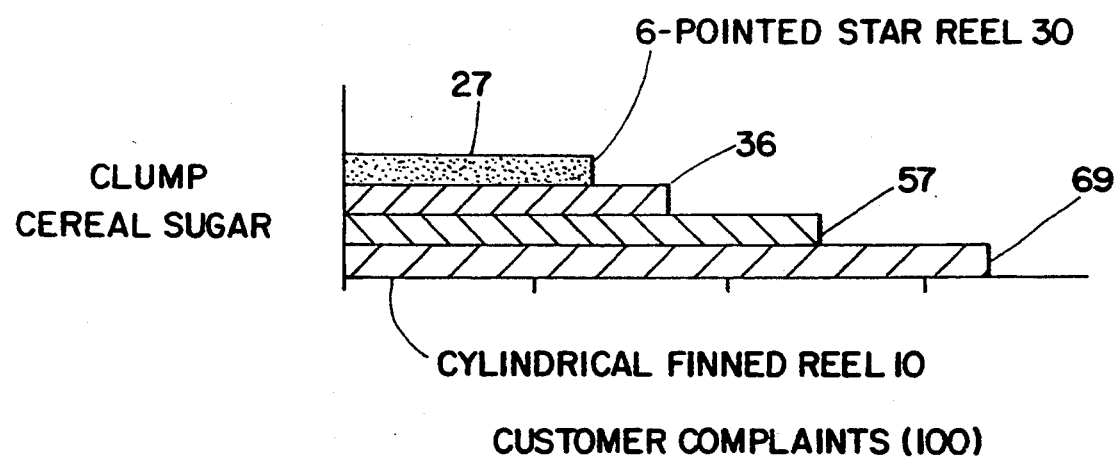
FIG. 8 illustrates a graphical bar plot of the comparison of typical customer complaints concerning topical substance-coated cereals and produced in accordance with the prior art in contrast with cereals coated with a topical substance in a star-shaped reel pursuant to the present invention.

In summation, the star-shaped reel pursuant to the invention provides for an improved construction which clearly an unambiguously enables a more efficient and troublefree coating of base substances, such as dry cereals or the like with topical substances, comprising various sugar solutions, dextrins and fructose, or vitamins in fats, in a more efficient and uniform manner. Hereby, as shown in the bar graph of FIG. 8 of the drawings, customer complaints with regard to clump cereal sugar caused by lumping and agglomeration in the reel have been reduced to less than one-half from an initial number of 69 for cylindrical reels 10 pursuant to the prior art, to 51 and 36 for transitional reel cross-sections, down to 27 for the six-pointed star-shaped reel 30 pursuant to the invention. These complaint figures are predicated as a ratio of normally 100 complaints received from customers relative to a particular cereal product.

While there has been shown and described what are considered to be preferred embodiments of the invention, it will, of course, be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. Apparatus for the coating of a cereal with a topical substance, including a rotatable elongated hollow reel having a first inlet end for the infeed of quantities of said cereal, means extending into said reel for projecting a spray of a topical substance into surface contact with the cereal, said reel having a second end for the discharge of the topical substance-coated cereal; the improvement comprising in that said hollow reel has a generally star-shaped transverse cross-sectional configuration forming a plurality of longitudinally extending pockets about the internal circumference of said reel and imparting a tumbling action to the cereal during rotation of said reel so as to uniformly distribute and coat the topical substance onto the cereal prior to discharge from the reel and wherein the radially-outermost apex of each pocket-forming star point of said reel has a rounded or flattened surface portion intermediate the juncture between the convergent walls of the star point to thereby eliminate the formation of a wedge tending to entrap and produce lumps and agglomerations of fines from the topical substance-coated cereal.

2. Apparatus as claimed in claim 1, wherein the flattened surface is formed by bending said apex.

3. Apparatus as claimed in claim 1, wherein the apex of each pocket-forming star point of said reel has a flattened surface portion intermediate the juncture between the convergent walls of the star point, said flattened surface being in the form of an internal plate welded to the insides of said convergent walls.

4. Apparatus as claimed in claim 1, wherein said reel forms a six-pointed star in transverse cross-section and wherein each said star point on said reel subtends an included angle of at least about 90° and an external obtuse angle of about 150° intermediate adjacent star points on said reel.

5. Apparatus as claimed in claim 1, wherein said reel includes a first section having impervious sidewalls, a second fine-meshed screen material section connected to the discharge end of said first reel section, and wherein said first and second reel sections extend in a coaxial orientation with each other.

6. An arrangement as claimed in claim 1, wherein the longitudinal axis of said reel is angled downwardly from the first end towards the second end thereof during rotation of said reel so as to continually convey the dry cereal towards discharge from said second end while facilitating the uniform coating and solidification of the topical substances on the surfaces of the dry cereal during tumbling within said reel.

7. Apparatus as claimed in claim 1, wherein angled support ribs extend along the axial length of the reel at the junctures of the bases of each of said star point so as to provide a reinforcing structure for the sidewalls of said reel.

8. Apparatus as claimed in claim 1, wherein trunnions encompass the perimeter of said reel for supporting said reel for rotation above the longitudinal axis thereof.

9. Apparatus as claimed in claim 1, wherein said reel is constituted from ultra high molecular weight (UHMW) polyethylene, stainless steel, or ceramic coated stainless steel.

10. Apparatus as claimed in claim 1, wherein said reel is constituted from stainless steel or ceramic coated stainless steel and wherein heating means is positioned proximate the external circumferential surface of said reel for heating the internal atmosphere of said reel.

11. Apparatus as claimed in claim 1, wherein the sidewalls of said reel are constituted of a fine-meshed screen material enabling the discharge of fines therethrough from the interior of said reel.

12. Apparatus as claimed in claim 11, wherein said screen material for said reel comprises fluorocarbon resin coated fiberglass, ceramic-coated stainless steel, or nylon.

* * * * *